United States Patent
Wallmann et al.

(10) Patent No.: US 8,590,619 B2
(45) Date of Patent: Nov. 26, 2013

(54) METHOD FOR PRODUCING NATURAL GAS FROM HYDROCARBON HYDRATES WHILE SIMULTANEOUSLY STORING CARBON DIOXIDE IN GEOLOGICAL FORMATIONS

(75) Inventors: Klaus Wallmann, Wankendorf (DE); Matthias Haeckel, Kiel (DE)

(73) Assignee: Leibniz-Institut Fuer Meereswissenschaften, Kiel (DE)

( * ) Notice: Subject to any disclaimer, the term of this patent is extended or adjusted under 35 U.S.C. 154(b) by 0 days.

(21) Appl. No.: 13/147,101

(22) PCT Filed: Jan. 22, 2010

(86) PCT No.: PCT/DE2010/000059
§ 371 (c)(1),
(2), (4) Date: Oct. 4, 2011

(87) PCT Pub. No.: WO2010/088874
PCT Pub. Date: Aug. 12, 2010

(65) Prior Publication Data
US 2012/0012321 A1    Jan. 19, 2012

(30) Foreign Application Priority Data
Feb. 4, 2009   (DE) .......................... 10 2009 007 453

(51) Int. Cl.
*A62D 3/00*  (2007.01)
*E21B 43/16*  (2006.01)
*E21B 43/22*  (2006.01)

(52) U.S. Cl.
USPC ............ 166/302; 166/305.1; 166/371; 299/3; 299/9; 405/129.1; 585/1; 588/250

(58) Field of Classification Search
None
See application file for complete search history.

(56) References Cited

U.S. PATENT DOCUMENTS

| 5,261,490 A | 11/1993 | Ebinuma |
| 5,950,732 A * | 9/1999 | Agee et al. ..................... 166/354 |
| 7,165,621 B2 | 1/2007 | Ayoub et al. |
| 7,222,673 B2 | 5/2007 | Graue et al. |
| 2004/0200618 A1 * | 10/2004 | Piekenbrock .............. 166/305.1 |
| 2006/0032637 A1 | 2/2006 | Ayoub et al. |
| 2006/0060356 A1 * | 3/2006 | Graue et al. ............... 166/305.1 |
| 2009/0032248 A1 * | 2/2009 | Svoboda et al. .............. 166/249 |
| 2009/0260828 A1 * | 10/2009 | Kubala et al. .............. 166/308.3 |

FOREIGN PATENT DOCUMENTS

| EP | 2058471 | 5/2009 |
| GB | 2 445 120 | 6/2008 |
| JP | 2004003326 | 1/2004 |
| RU | 2076209 | 3/1997 |
| WO | WO 2005/076904 | 8/2005 |
| WO | 2006000663 | 1/2006 |
| WO | WO 2007/133461 | 11/2007 |

* cited by examiner

Primary Examiner — George Suchfield
(74) Attorney, Agent, or Firm — Diederiks & Whitelaw PLC

(57) ABSTRACT

The invention relates to a method for extracting methane from methane hydrates, comprising the following steps: feeding carbon dioxide to the methane hydrate deposits; allowing the carbon dioxide to take effect on the methane hydrate to release methane and store the carbon dioxide as carbon dioxide hydrate; and removing the released methane, characterized in that the fed carbon dioxide is supercritical carbon dioxide.

14 Claims, 3 Drawing Sheets

METHOD FOR PRODUCING NATURAL GAS FROM HYDROCARBON HYDRATES WHILE SIMULTANEOUSLY STORING CARBON DIOXIDE IN GEOLOGICAL FORMATIONS

CROSS-REFERENCE TO RELATED APPLICATIONS

This application represents a National Stage application of PCT/DE2010/000,059 entitled "Method for Producing Natural Gas from Hydrocarbon Hydrates while Simultaneously Storing Carbon Dioxide in Geological Formations" filed Jan. 22, 2010, pending.

BACKGROUND OF THE INVENTION

The invention relates to a method for producing methane stored in gas hydrates while at the same time storing carbon dioxide ($CO_2$) in the geological subsoil.

Huge amounts of natural gas are stored in the sea bed as solid, ice-like methane hydrate. These natural methane hydrate deposits are therefore submerged and probably contain more energy and carbon (app. 3000 Gt C) than all conventional coal, oil and gas deposits on our planet. Therefore the gas hydrates play an important role as natural-gas source of the future. Methane hydrates were confirmed on almost all continental shelves at a depth in the water below approximately 400 m. They are stable only at high pressures and low temperatures. They occur where enough organic carbon was embedded into the sediment and the pressure and temperature conditions permit the fixation of methane in methane hydrates. Many coastal states have large national deposits (for example China, India, Japan, South Korea, Brazil, Chile, the US, Canada, Norway, Russia). On top of this methane hydrates were detected on land below thick permafrost deposits. These hydrate deposits are known above all from Siberia, Canada and Alaska.

FIG. 1 shows the phase diagram of methane in sea water. The methane hydrates are only stable at high pressures and low temperatures. The phase boundary between hydrate and gas applies for pure methane hydrate of the lattice type I and for sea water having a salt content of 35% by weight.

The phase boundaries applies for pure methane hydrate having the lattice type I. Methane hydrates exist in different lattice types. Type I is the most common and the most widely existing variant.

FIG. 2 shows a methane hydrate cluster of the lattice type I; in this type, there is on average one methane molecule for 5.7 water molecules. The methane molecules are represented by big spheres, while the small spheres connected by black lines represent the hydrate lattice that is made up of water molecules.

At the present time, methane hydrate deposits are developed all over the world to produce natural gas. To extract natural gas, the hydrates at first have to be broken down in the geological subsoil. In the process, the methane that is fixated in the water cages of the hydrates is released as gas that can be extracted by means of one or more boreholes using conventional technology. At present, it is essentially the following different approaches that are pursued:
- the pressure in the deposit is lowered;
- the temperature in the deposit is increased;
- chemical substances are added to decompose the hydrates.

U.S. Pat. No. 7,222,673 discloses to replace methane from the gas hydrates for carbon dioxide ($CO_2$) without destroying the hydrate structure. In the process, the hydrates are brought into contact with liquid $CO_2$. The reaction takes place without energy being supplied externally since the $CO_2$ hydrates that are formed are more stable than the natural methane hydrates. This type of extracting natural gas has the added advantage that at the same time $CO_2$ that is also responsible for heating up the Earth as a climate-relevant greenhouse gas can be safely stored underground and thus be removed from the atmosphere. A disadvantage of this method is the tow speed of the substitution reaction while maintaining the hydrate structure, which only allows very low production rates.

WO2005/076904 describes a method for storing $CO_2$ under the sea bed by introducing gaseous $CO_2$ into methane hydrate fields. $CO_2$ hydrate is formed, the heat that is released leads to the dissociation of the methane hydrate and to the release of the methane. It is planned to collect and use the methane gas that has been released. The high content of gaseous $CO_2$ is a disadvantage when using the methane gas that has been released for generating energy by combustion. The production rates that are possible are likewise low since the release of the methane from the methane hydrate is only possible with the aid of the heat that is released by the $CO_2$ hydrate formation.

SUMMARY OF THE INVENTION

It is therefore the object of the invention to create a method for extracting carbon hydrates, in particular methane, from the hydrates at production rates that are higher than previously possible, and at the same time to store $CO_2$ in geological formations.

For extracting natural gas and for storing $CO_2$ in the subsoil, it is proposed to inject supercritical $CO_2$ into the hydrate deposits. In the process, the methane hydrates are broken down thermally and chemically at a high speed and in a large range around the injection bore, so that high natural gas production rates can be achieved.

DETAILED DESCRIPTION OF THE INVENTION

Figure 1:
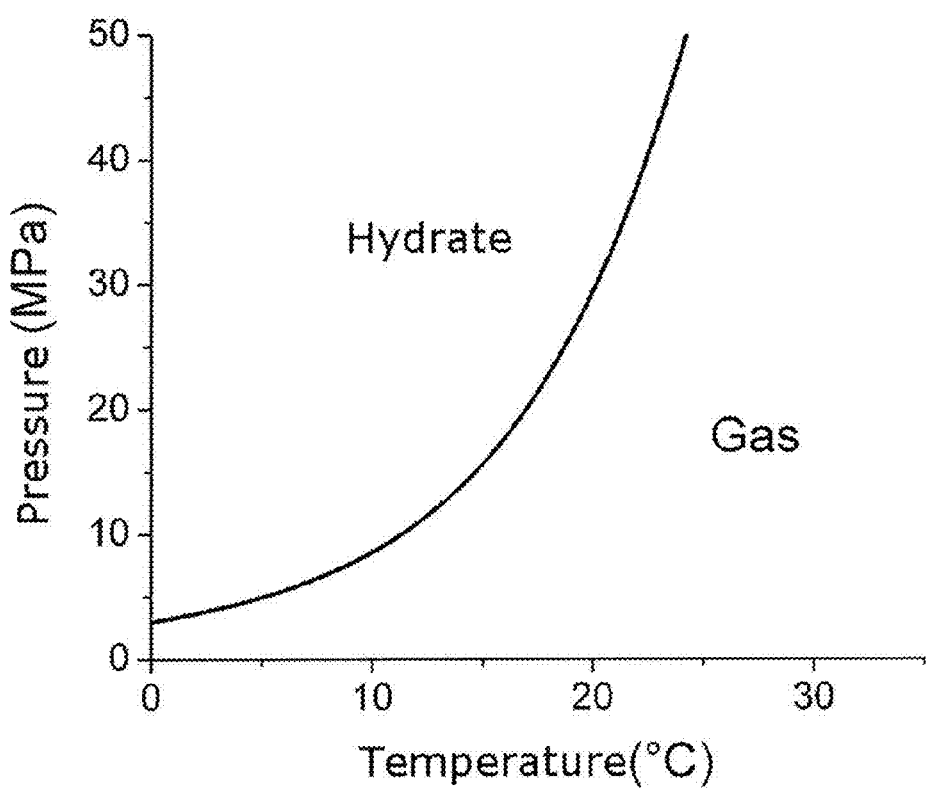
FIG. 1 shows the phase diagram of methane in sea water.
Figure 2:
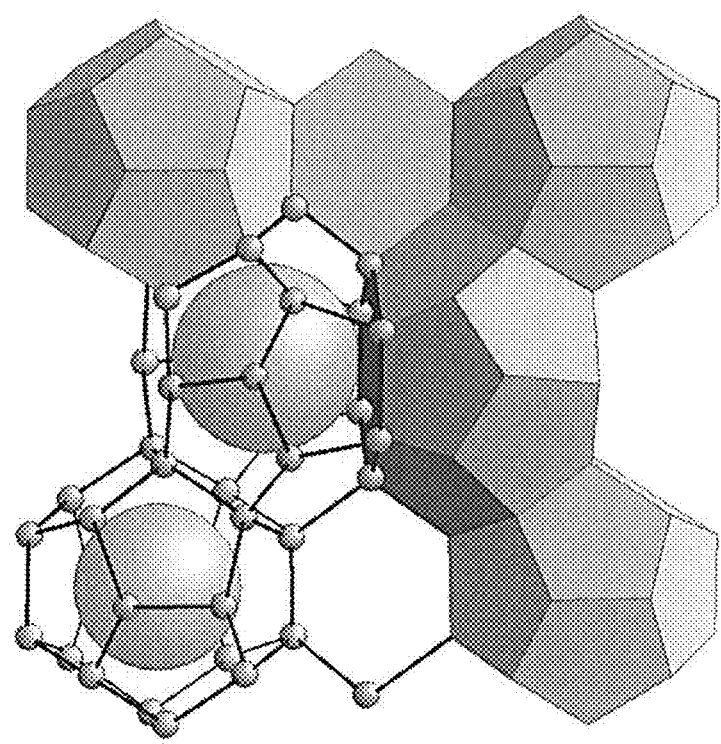
FIG. 2 shows a methane hydrate cluster of the lattice type I; in this type, there is on average one methane molecule for 5.7 water molecules.
Figure 3:
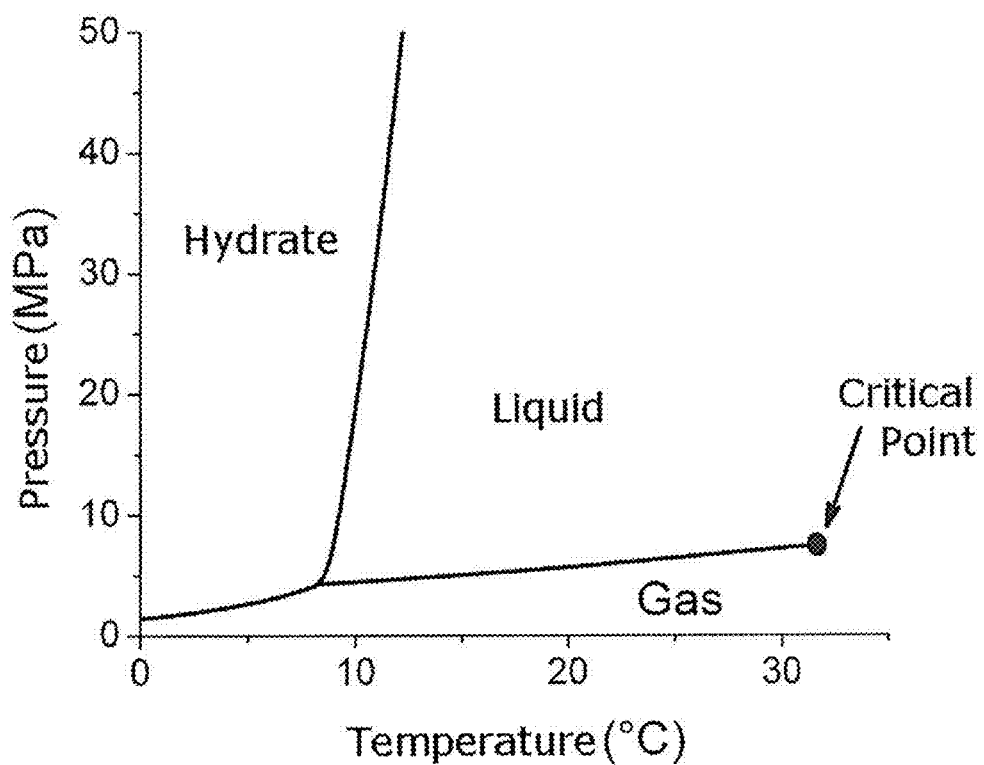
FIG. 3 shows the phrase diagram of $CO_2$ in sea water as a function of the pressure and the temperature.

FIG. 3 shows the phase diagram of $CO_2$ in sea water as a function of the pressure and the temperature. The phase limit between hydrate and liquid $CO_2$ applies for pure $CO_2$ hydrate having the lattice type I and for sea water having a salt content of 35% by weight. The critical $CO_2$ point is at 7.4 MPa and 31.48° C. At higher temperatures and pressures, $CO_2$ is transferred into the so-called supercritical phase. The special thing about this phase is that there are no abrupt transitions and energy barriers between the gaseous and liquid state; it can no longer be discriminated between the gas and liquid phases. Supercritical $CO_2$ is different from liquid or gaseous $CO_2$. It consists of $CO_2$ clusters that are interconnected only loosely. It exhibits very special attributes that are particularly favourable for producing natural gas from hydrates.

Supercritical $CO_2$ reacts very willingly and fast with the methane hydrates since the methane hydrates are broken down both thermally and chemically. At temperatures above 31.48° C., the methane hydrates are unstable and are thus melted by the supercritical $CO_2$. The thermal break down of the methane hydrate takes place at a much higher speed than the slow exchange of gas molecules, while the hydrate structure is being maintained. At the same time, the water cages are attacked by the chemical reaction with the $CO_2$ clusters and broken down. Because of the thermal and chemical energies that act simultaneously, the release of natural gas from methane hydrate with supercritical $CO_2$ takes place faster than with liquid or gaseous $CO_2$ or with warm water of the same temperature.

The injected super critical $CO_2$ fluid exhibits a low viscosity and a high mobility. Therefore the heat can propagate fast in the subsoil by fast convection of the low-viscous supercritical $CO_2$ in the pore space so that the methane hydrates are melted in a large area around the injection borehole. Due to the flow properties of supercritical $CO_2$, the inventive release of natural gas from methane hydrate proceeds considerably more effectively than when warm water of the same temperature is used, since at the same temperature, supercritical $CO_2$ has a markedly lower viscosity and higher propagation speed than warm water.

An additional advantage of the method that has been proposed lies in the fact that no or only little $CO_2$ hydrate is produced in the vicinity of the injection borehole on account of the local temperature increase, thus avoiding a clogging of the feed pipes and the pore space.

In the method that has been proposed, furthermore the pore space and the remaining formation water are saturated with $CO_2$ so that the reverse reaction, i.e. the formation of methane hydrate from the natural gas that has been released, is avoided.

Using the method that has been proposed, natural gas production rates can be achieved that are attractive economically. In this way, further methods for breaking down the methane hydrates, such as the injection of warm water, lowering the pressure, or adding chemical substances, can be dispensed with.

The supercritical $CO_2$ remains in the subsoil. It will cool down slowly over the course of time and finally convert into $CO_2$ hydrate.

According to the invention, the methane hydrate is initially melted and decomposed, the $CO_2$ hydrate is formed at a later point in time, after the production of natural gas has been terminated partially or completely and the heat has left the reservoir by conduction.

The method can be realised in different variants. For example it is possible to introduce the supercritical $CO_2$ into the deposit using a separate injection borehole. For this purpose, the borehole has to be insulated thermally, such as by using thermally insulated pipes, to minimise the heat loss between the drilling platform and the deposit. The methane gas that has been released can be extracted via a separate borehole. It is also possible to carry out the $CO_2$ injection and the natural gas extraction by one and the same borehole. Furthermore, also horizontal drilling can be carried out or hydro fracturing methods can be used to increase the permeability of the hydrate-containing sediment layers.

The invention claimed is:

1. A method for extracting methane from methane hydrates, comprising the following steps:
   feeding carbon dioxide to methane hydrate deposits;
   allowing the carbon dioxide to take effect on the methane hydrate while releasing methane and storing the carbon dioxide as carbon dioxide hydrate;
   removing the released methane,
   characterised in that
   the fed carbon dioxide is supercritical carbon dioxide.

2. The method according to claim 1, characterised in that the fed supercritical carbon dioxide is at a pressure of more than 7.4 MPa and is kept at a temperature of more than 31.48° C.

3. The method according to claim 2, characterised in that the supercritical carbon dioxide is fed to natural methane hydrate deposits.

4. The method according to claim 2, characterised in that the supercritical carbon dioxide is fed to the methane hydrate deposits in thermally insulated pipes.

5. The method according to claim 2, characterised in that the supercritical carbon dioxide is injected into the methane hydrate deposits.

6. The method according to claim 1, characterised in that the supercritical carbon dioxide is fed to natural methane hydrate deposits.

7. The method according to claim 6, characterised in that the natural methane hydrate deposits are submerged.

8. The method according to claim 7, characterised in that the supercritical carbon dioxide is fed to the methane hydrate deposits in thermally insulated pipes.

9. The method according to claim 7, characterised in that the supercritical carbon dioxide is injected into the methane hydrate deposits.

10. The method according to claim 6, characterised in that the supercritical carbon dioxide is fed to the methane hydrate deposits in thermally insulated pipes.

11. The method according to claim 6 characterised in that the supercritical carbon dioxide is injected into the methane hydrate deposits.

12. The method according to claim 1, characterised in that the supercritical carbon dioxide is fed to the methane hydrate deposits in thermally insulated pipes.

13. The method according to claim 12, characterised in that the supercritical carbon dioxide is injected into the methane hydrate deposits.

14. The method according to claim 1, characterised in that the supercritical carbon dioxide is injected into the methane hydrate deposits.

* * * * *